United States Patent Office 3,233,766
Patented Feb. 8, 1966

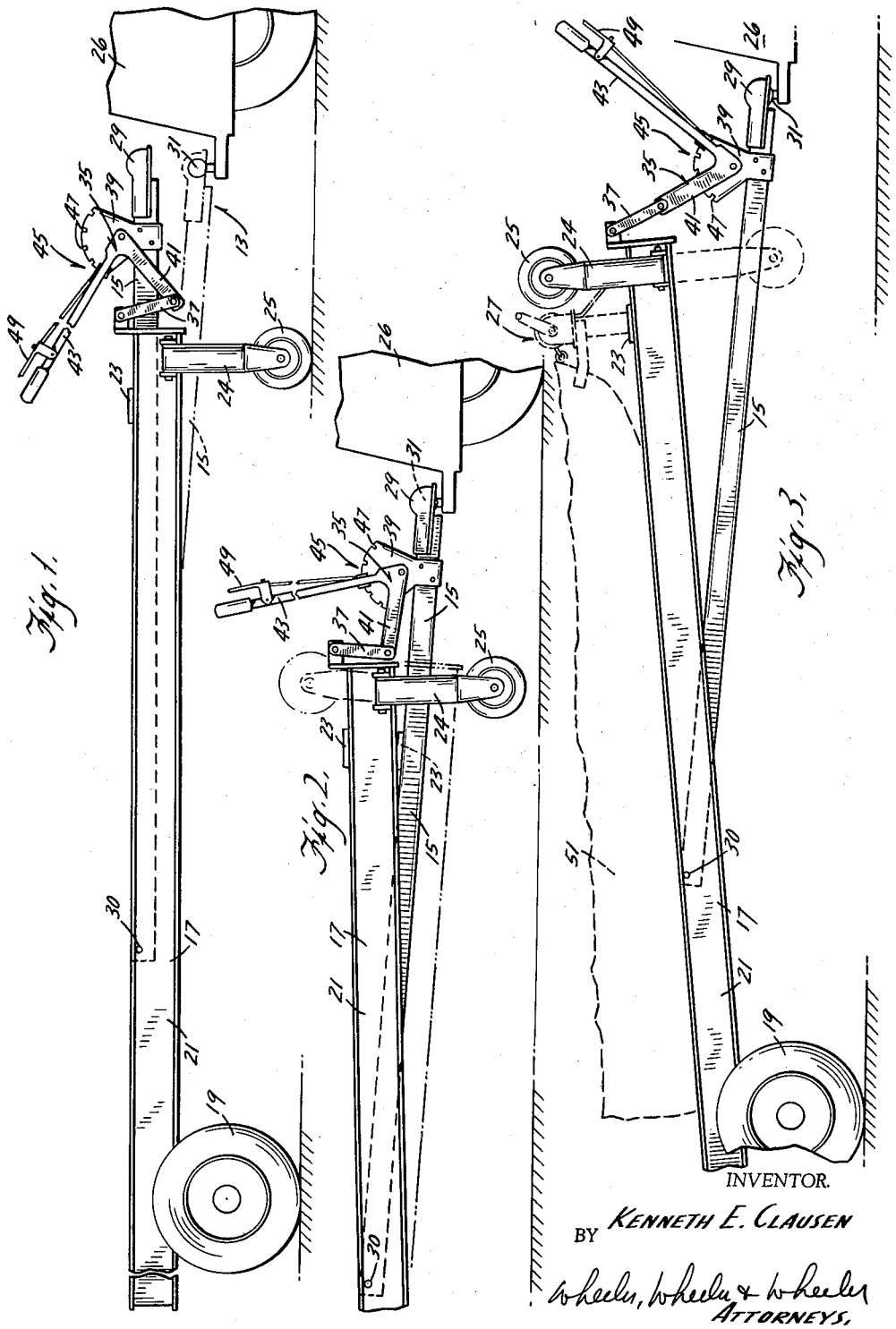

3,233,766
TRAILER COUPLING
Kenneth E. Clausen, Waukegan, Ill., assignor to Outboard Marine Corporation, Waukegan, Ill., a corporation of Delaware
Continuation of application Ser. No. 188,025, Apr. 17, 1962. This application Nov. 5, 1964, Ser. No. 409,186
4 Claims. (Cl. 214—505)

This application is a continuation of my previous application Serial No. 188,025, filed April 17, 1962, now abandoned.

The invention relates generally to trailers, and particularly to arrangements for tilting the bed of a trailer when the trailer is coupled to a towing vehicle. Still more particularly, the invention relates to boat and other type trailers including a bed or frame which is pivotally supported by a pair of rearward wheels and which is normally retained in a generally horizontal parking position, when unattached to a towing vehicle, by a third supporting member, which can include a parking wheel, carried at the forward end of the bed.

The invention constitutes a further development of the subject matter disclosed and claimed in my copending application, Serial No. 188,102, now Patent No. 3,152,881, entitled: "Front Trailer Wheel Arrangement" filed on April 17, 1962, and contemplates a hitch bar carrying a coupling element which is vertically displaceable relative to the bed for connection to a mating coupling component mounted on a towing vehicle, when the weight of the trailer is supported by the rear wheels and the forward supporting member, thereby eliminating lifting of the weight of the trailer when coupling the trailer to a towing vehicle. In the preferred embodiment, the hitch bar is pivotally mounted to the frame or bed of the trailer at a point spaced rearwardly of the forward end thereof.

The invention also contemplates the incorporation of means affording vertical displacement of the coupling element relative to the trailer bed, both when the bed is supported by the rear wheels and by the forward support member, thereby to permit vertical positioning of the coupling element relative to a mating coupling component on a towing vehicle, and when the hitch bar is supported at its forward end, as by connection of the coupling element to a towing vehicle, thereby to effect tilting of the trailer bed. In the preferred embodiment, the hitch bar is angularly displaceable relative to the bed to vertically position the coupling element relative to the bed by a bell crank lever which is pivotally mounted on the hitch bar and is pivotally connected to one end of a link which, at its other end, is pivotally connected to the forward end of the frame.

Such tiltability of the trailer bed advantageously enables elevation of its forward end to facilitate positioning of the parking wheel in a retracted position. With the parking wheel thus retracted, the bed is thereafter tiltable to a forwardly and downwardly inclined trailing position. In addition, when desired to launch or recover a boat, the bed is tiltable to a rearwardly and downwardly inclined disposition. This feature is of particular importance when recovering boats on a ramp having insufficient incline to permit initial entry of the rear end of the trailer under a boat, while retaining the trailer in coupled relation to the towing vehicle. In some circumstances, this feature also aids in facilitating boat launching from the trailer. In addition, the construction of the trailer bed includes a frame member which rests on the hitch bar for transmission of the load thereto when the bed is in its trailing condition.

Other advantages of the invention will become apparent by reference to the following description and the accompanying drawings of one embodiment.

FIGURE 1 is a fragmentary side elevational view of a trailer embodying various of the features of the invention; showing in full lines, the trailer in parked, uncoupled relation to a towing vehicle and, in dotted lines, the disposition of the coupling arrangement during engagement thereof;

FIGURE 2 is a fragmentary side elevational view similar to FIGURE 1; showing, in full lines, connection of the trailer to the towing vehicle with the parking wheel elevated in relation to the supporting surface and showing, in dotted lines, connection of the trailer to the towing vehicle with the bed lowered for travel and with the parking wheel in a retracted position; and FIGURE 3 is a fragmentary side elevational view similar to FIGURE 1; showing the trailer coupled to the towing vehicle with the bed in its fully tilted position facilitating loading and unloading of a boat thereon, which boat is shown in dotted outline in its loaded position.

The boat trailer 11 shown in the drawings embodies a coupling arrangement 13 including a tow or hitch bar 15, which arrangement can be used with a wide range of trailers. The boat trailer 11 includes a bed or frame 17 which comprises a pair of longitudinally extending, horizontally spaced frame members 21, which may converge at their forward ends, and a bridging member 23 which connects the frame members adjacent their forward ends. When the trailer is in its trailing disposition, the bridging member engages the hitch bar 15 for support of the bed 17 by the hitch bar 15. The trailer bed 17 is pivotally supported, rearwardly of its center of gravity, by a pair of wheels 19 which are mounted on aligned axes.

The trailer bed is retainable in a generally horizontal parking condition, when uncoupled from a towing vehicle 26, by a third, forwardly located supporting member or strut 24 which, in the disclosed construction, carries a caster type, parking wheel 25. The use of a caster type parking wheel facilitates localized movement of the trailer, especially shifting of the trailer relative to the towing vehicle 26, to effect coupling thereof. Of course, supporting members without a caster type wheel can also be employed.

The strut 24 is carried on a horizontal pivot and is selectively positionable in either of a downwardly projecting, load-carrying position and a relatively elevated, retracted position affording disposition of the trailer bed 17 in a forwardly and downwardly inclined trailing disposition when the trailer is coupled to the towing vehicle 26. In the disclosed construction, as shown in FIGURES 2 and 3, the retracted position is an upwardly projecting position. Various means can be provided for releasably retaining the strut 24 in either of its downwardly projecting or retracted positions.

Also included on the boat trailer 11 are winch means 27 (see FIGURE 3) of conventional construction for hauling a boat onto the bed 17.

The coupling arrangement 13 includes conventional components, such as a coupling element or tongue 29 carried by the hitch bar 15 at its forward end and a coupling component or ball 31 carried by the towing vehicle 26. As the height of the ball 31 is less than the height of the bed 17 above the rear wheels 19, the forward end of the trailer bed 17 is disposed, when the trailer is parked, above the level of the ball 31 on the towing vehicle 26.

The hitch bar 15 is mounted on the trailer 11 by means pivotally connecting one end of the hitch bar to the frame between the wheels and the strut so as to afford vertical displacement of the tongue 29 relative to the adjacent or forward end of the trailer bed 17. More particularly, the hitch bar 15 constitutes an elongated structural member or beam and, at its rearward end, is pivotally connected by means of a generally horizontal pivot 30, to the trailer bed 17 at a point located intermediate the frame members 21 and forwardly of the rear wheels 19.

Various means or arrangements connected to the hitch bar and to the frame can be used to effect vertical or angular displacement of the tongue 29 relative to the adjacent end of the bed 17. In the preferred construction, the hitch bar 15 is pivotable relative to the bed by connecting means in the form of a bell crank lever 35 and a link 37. More specifically, the lever 35 is pivotally mounted on a bracket 39 fixed to the hitch bar 15 and includes a short leg 41 pivotally connected, at its outer end, to one end of the link 37, and a relatively long arm or leg 43 providing a substantial mechanical advantage over any moment-producing-force applied to the short leg 41 by the link 37. In turn, the link 37 is pivotally connected at its other end to the adjacent end of the trailer bed 17.

Releasable retention of the hitch bar 15 relative to the trailer bed 17 is provided by a conventional detent mechanism 45 including a series of detents or notches 47 along the upper arcuate periphery of the bracket 39 and a dog or key (not shown) which is carried by the long arm 43 of the lever 35 and is releasably engageable in the notches 47 by operation of a trigger 49 also carried on the long arm 43 of the lever 35.

In operation, when it is desired to couple the trailer 11 to the towing vehicle 26, the lever 35 is initially operated to raise the tongue 29 until it is disposed above the height of the ball 31 on the towing vehicle 26. The lever 35 is then rocked in a clockwise direction, as seen in the drawings, to lower the tongue 29 onto the ball 31. It is noted that thus far, movement of the lever 35 has resulted only in swinging the hitch bar 15 and that tilting of the trailer bed 17 is unnecessary to effect initial attachment of the trailer 11 to a towing vehicle 26.

With the tongue 29 coupled to the ball 31, the lever 35 can now be rocked clockwise, thereby elevating the adjacent end of the trailer bed 17 relative to the hitch bar 15 and lifting the strut 24 from the supporting surface, thereby permitting displacement thereof to its retracted position. The lever 35 is then shifted counterclockwise to effect pivoting of the trailer bed 17 in a clockwise direction until the trailer bed is disposed in forwardly and downwardly inclined trailing relation to the towing vehicle. In this trailing position, the bridging member 23 rests on the hitch bar 15, thereby removing any gravity load from the detent mechanism 45.

When it is desired to tilt the bed 17 to a downwardly and rearwardly inclined disposition to aid in launching or recovery of a boat 51, the lever is rocked clockwise to its forwardmost position, thereby pivoting the trailer bed 17 counterclockwise to the position shown in FIGURE 3.

When it is desired to uncouple the trailer from the towing vehicle 26, the lever 35 is rocked clockwise, thereby elevating the forward end of the trailer bed 17 to permit repositioning of the strut 24 in its downwardly projecting position. The lever 35 is then rocked counterclockwise, lowering the adjacent end of the trailer bed 17 until the strut 24 engages the supporting surface. Continued counterclockwise movement of the lever 35 elevates the tongue 29 from the ball 31 to disconnect the trailer from the towing vehicle.

From the foregoing, it is evident that the connecting means is operable, when the trailer frame or bed 17 is supported on the ground solely by the wheels 19 and the strut 24, to shift the hitch bar 15 independently of the strut 24 so as to afford support of the hitch bar 15 by the bed 17 and so as to afford vertical adjustment of the free hitch bar end or coupling 29 with respect to a tractor in the absence of any load imposed on the hitch bar 15 from the bed 17. In addition, the connecting means is operable, when the free hitch bar end is supported at a predetermined level above the ground and without bodily displacement of the hitch bar, to elevate the adjacent end of the bed 17 to thereby disengage the strut 24 from the ground to afford retraction of the strut and to lower the adjacent end of the bed onto the hitch bar 15 when the strut 24 is retracted. The connecting means is therefore operable, while maintaining connection of the hitch bar to a coupling on a tractor, and without displacement of the tractor along the ground, for raising and lowering the strut relative to a bed supporting ground engagement wherein the bed is solely supported by the strut and the wheels.

Various of the features of the invention are set forth in the following claims.

What is claimed is:

1. A vehicle including a frame, means for supporting said frame in spaced relation to a supporting surface including wheel means, means mounting said wheel means on said frame to afford pivotal movement of said frame relative to said wheel means, a strut, and means mounting said strut at one end of said frame in spaced relation to said wheel means for frame supporting engagement with the supporting surface, a hitch bar including at one end thereof a coupling element adapted for connection to a complementary coupling component on a towing vehicle, means mounting the other end of said hitch bar on said frame for vertical movement of said one end of said hitch bar relative to said one end of said frame when said frame is supported on said wheel means and on said strut, said means mounting said other end of said hitch bar comprising a pivot affording movement of said hitch bar through a vertical arc and means on said frame for varying vertical displacement between said one end of said hitch bar and said one end of said frame comprising a linkage including a link pivoted at one end to said one end of said frame, and a lever pivotally mounted on said hitch bar, said lever including one short leg pivotally connected to the other end of said link and one free long leg affording substantial mechanical advantage over the action of said link on said short leg, and a releasable detent mechanism mounted on said hitch bar and on said lever for releasably preventing shifting of said lever, whereby said vertical displacement means is operable to position said coupling element for connection to the coupling component without effecting the disposition of said frame on said wheel means and said strut, and whereby when said coupling element is connected to the coupling component, said vertical displacement means is operable to elevate said one end of said frame relative to said coupling element and to the supporting surface so as to relieve the supporting engagement of said strut with the supporting surface.

2. An improvement in accordance with claim 1 wherein said means mounting said hitch bar is spaced substantially from said one end of said frame, and said frame includes means engageable with said hitch bar for preventing relative angular movement in one direction past a predetermined point of said hitch bar relative to said frame, whereby to effect load transmission between said frame and said hitch bar when said hitch bar is engaged by said engageable means.

3. A vehicle comprising a frame, a pair of wheels, means supporting said wheels on said frame to afford pivotal movement of said frame relative to said wheels, a strut having at one end thereof a caster wheel, means mounting the other end of said strut adjacent to one end of said frame in spaced relation from said wheels, a hitch bar, means pivotally connecting one end of said hitch bar to the frame between said wheel supporting means and said strut mounting means, and means connected between said hitch bar and said one end of said frame for angularly displacing said hitch bar and said frame relative to each other whereby, when said frame is supported by said wheels and said strut, said hitch bar can be vertically positioned for coupling and, when said hitch bar is coupled to a tractor, said frame and said strut can be raised relative to said hitch bar.

4. A vehicle adapted to be pulled by a tractor, said vehicle comprising a frame, a pair of wheels, means supporting said wheels on said frame to afford pivotal movement of said frame relative to said wheels, a strut having at one end thereof a caster wheel, means mounting the other end of said strut on said frame in spaced relation from said wheels for movement between a first retracted position and a second position extending downwardly from said frame, a hitch bar, means pivotally connecting one end of said hitch bar to said frame between said wheel supporting means and said strut mounting means, and means connected between said hitch bar and said frame for angularly displacing said hitch bar and said frame relative to each other whereby, when said frame is supported by said wheels and said strut, said hitch bar can be vertically positioned for coupling and, when said hitch bar is coupled to a tractor, said frame and said strut can be raised relative to said hitch bar to facilitate movement of said strut between said first and second positions.

References Cited by the Examiner

UNITED STATES PATENTS 2,628,126　2/1953　Black _____ 214—505 X

FOREIGN PATENTS 761,292　3/1957　Great Britain.
1,193,381　4/1959　France.

HUGO O. SCHULZ, *Primary Examiner.*